(12) United States Patent
Makita et al.

(10) Patent No.: US 8,789,236 B2
(45) Date of Patent: Jul. 29, 2014

(54) SUBSTRATE CLEANING APPARATUS

(75) Inventors: Hideshi Makita, Osaka (JP); Toru Tanigawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 636 days.

(21) Appl. No.: 13/140,527

(22) PCT Filed: Nov. 9, 2009

(86) PCT No.: PCT/JP2009/069030
§ 371 (c)(1),
(2), (4) Date: Jun. 17, 2011

(87) PCT Pub. No.: WO2010/070993
PCT Pub. Date: Jun. 24, 2010

(65) Prior Publication Data
US 2011/0258808 A1    Oct. 27, 2011

(30) Foreign Application Priority Data
Dec. 19, 2010 (JP) ................................ 2008-323620

(51) Int. Cl.
*A47L 9/06* (2006.01)
*B08B 5/00* (2006.01)

(52) U.S. Cl.
USPC .............................................. 15/401; 15/303

(58) Field of Classification Search
USPC ............ 15/301, 303, 401; 134/6, 7, 9, 10, 15, 134/21, 37
IPC .......... A47L 9/06; B08B 1/00,5/04; G02F 1/13, G02F 1/1333; C03C 23/00
See application file for complete search history.

(56) References Cited

U.S. PATENT DOCUMENTS

| | | | | |
|---|---|---|---|---|
| 5,885,363 A | * | 3/1999 | Nakamura | ........................ 134/6 |
| 5,933,901 A | | 8/1999 | Nakamura | |

FOREIGN PATENT DOCUMENTS

| | | |
|---|---|---|
| JP | 60-97844 U | 7/1985 |
| JP | 5-333198 A | 12/1993 |
| JP | 9-212059 A | 8/1997 |
| JP | 10-39282 A | 2/1998 |
| JP | 10-109075 A | 4/1998 |
| JP | 10-146606 A | 6/1998 |
| JP | 11-95242 A | 4/1999 |
| JP | 2000-15188 A | 1/2000 |
| JP | 2002-244115 A | 8/2002 |

OTHER PUBLICATIONS

International Search Report dated Dec. 8, 2009 for PCT/JP2009/069030.

* cited by examiner

*Primary Examiner* — David Redding
(74) *Attorney, Agent, or Firm* — Birch, Stewart, Kolasch & Birch, LLP

(57) ABSTRACT

A substrate cleaning apparatus includes a cleaning plate, a vibration unit for vibrating the cleaning plate, a suction unit having an intake opening in the vicinity of a tip end portion of the cleaning plate, for sucking an upper surface of a substrate to be cleaned without being in contact with the substrate, and a moving mechanism for moving the cleaning plate relative to the substrate. In the substrate cleaning apparatus, the tip end portion of the cleaning plate is pressed against the upper surface of the substrate to cause the cleaning plate to be elastically deformed, and the cleaning plate moves relative to the substrate in the cleaning direction of the substrate, with the tip end portion of the cleaning plate being in line contact or surface contact with the upper surface of the substrate. Such a configuration allows the substrate to be cleaned stably while preventing scratching the substrate.

5 Claims, 4 Drawing Sheets

SUBSTRATE CLEANING APPARATUS

TECHNICAL FIELD

The present invention relates to a substrate cleaning apparatus, and more particularly to a substrate cleaning apparatus for a glass substrate of a liquid crystal panel.

BACKGROUND ART

A liquid crystal panel is manufactured by laminating two glass substrates together, sealing liquid crystal therebetween, cutting the glass substrates into a predetermined size, and then affixing a polarizing plate on a surface of one of the cut glass substrates. In the step of cutting the glass substrates, cullet produced from the cut surfaces may adhere to the surfaces of the glass substrates. If a polarizing plate is affixed in a state in which cullet adheres, bubbles present between the polarizing plate and the glass substrate deteriorates the display quality of the liquid crystal panel.

Patent Documents 1 to 4 are prior arts which disclose liquid crystal panel cleaning apparatuses for removing cullet adhering to surfaces of glass substrates. A liquid crystal panel cleaning apparatus disclosed in Japanese Patent Laying-Open No. 2002-244115 (Patent Document 1) includes a rotating head unit having an opposing surface parallel to a surface of a liquid crystal panel. The head unit includes a flat plate-like blade formed of a carbide material, and a flat end portion is formed at the edge of the blade.

A liquid crystal panel terminal cleaning apparatus disclosed in Japanese Patent Laying-Open No. 11-095242 (Patent Document 2) includes a positioning means for positioning a liquid crystal panel. A cullet removing apparatus for a liquid crystal glass substrate as disclosed in Japanese Patent Laying-Open No. 10-039282 (Patent Document 3) includes a knife driven by a motor to rotate on its own axis and revolve around an axis. A cleaning apparatus for a liquid crystal panel as disclosed in Japanese Patent Laying-Open No. 2000-015188 (Patent Document 4) includes a first unit in which a first suction fixing means and a second cleaning means are integrally formed, and a second unit in which a second suction fixing means and a first cleaning means are integrally formed.

FIG. 8 is a cross-sectional view schematically illustrating an operation of a conventional substrate cleaning apparatus. FIG. 9 is a side view schematically showing a contact state between a blade of the substrate cleaning apparatus shown in FIG. 8 and a glass substrate. FIG. 10 is a cross-sectional view schematically showing a cross section of the blade included in the substrate cleaning apparatus.

As shown in FIG. 8, cullet 60 adheres to an upper surface of a first glass substrate 50 laminated on an upper surface of a second glass substrate 70. A tip end portion 10a of a blade 10 of the substrate cleaning apparatus is in contact with the upper surface of first glass substrate 50. This blade 10 moves on the upper surface of first glass substrate 50 in a cleaning direction relative to first glass substrate 50 thereby removing cullet 60 from the upper surface of first glass substrate 50.

Therefore, if the parallelism between tip end portion 10a of blade 10 and first glass substrate 50 is not kept, as shown in FIG. 9, tip end portion 10a of blade 10 and first glass substrate 50 come into contact with each other locally at one side end of blade 10. As shown in FIG. 10, tip end portion 10a of blade 10 included in the substrate cleaning apparatus is processed to have an acute angle. Blade 10 is not easily deformed because it is formed of a carbide material.

PRIOR ART DOCUMENTS

Patent Documents

Patent Document 1: Japanese Patent Laying-Open No. 2002-244115
Patent Document 2: Japanese Patent Laying-Open No. 11-095242
Patent Document 3: Japanese Patent Laying-Open No. 10-039282
Patent Document 4: Japanese Patent Laying-Open No. 2000-015188

SUMMARY OF THE INVENTION

Problems to be Solved by the Invention

In the liquid crystal panel cleaning apparatus disclosed in Japanese Patent Laying-Open No. 2002-244115, the blade is processed to have an acute angle. Therefore, when the tip end portion of the blade comes into contact locally with the upper surface of the glass substrate, locally high contact stress occurs and may cause a scratch on the glass substrate. In the cullet removing apparatuses disclosed in Patent Documents 2 to 4, cullet is removed by a knife, which may also cause a scratch on a glass substrate.

The present invention is made to solve the aforementioned problem. An object of the present invention is to provide a substrate cleaning apparatus capable of stably cleaning a substrate while preventing scratching the substrate.

Means for Solving the Problems

A substrate cleaning apparatus in accordance with the present invention includes: a cleaning plate; a vibration unit for vibrating the cleaning plate; a suction unit having an intake opening in the vicinity of a tip end portion of the cleaning plate, for sucking a substrate without being in contact with the substrate; and a moving mechanism for moving the cleaning plate relative to the substrate. In this substrate cleaning apparatus, the tip end portion of the cleaning plate is pressed against the upper surface of the substrate to cause the cleaning plate to be elastically deformed, and the cleaning plate moves relatively in a cleaning direction of the substrate, with the tip end portion of the cleaning plate being in line contact or surface contact with the upper surface of the substrate.

Effects of the Invention

According to the present invention, an elastically deformable cleaning plate is brought into line contact or surface contact with an upper surface of a substrate to clean the substrate, thereby preventing the cleaning plate from coming into contact locally with the substrate and causing a scratch. Furthermore, cleaning is carried out with the cleaning plate being vibrated, so that cullet is easily separated from the upper surface of the substrate. A suction unit arranged in the vicinity of a tip end portion of the cleaning plate prevents the separated cullet from adhering again to the upper surface of the substrate. Accordingly, the substrate can be cleaned stably.

MODES FOR CARRYING OUT THE INVENTION

In the following, a substrate cleaning apparatus in an embodiment based on the present invention will be described with reference to the figures.

Figure 1:
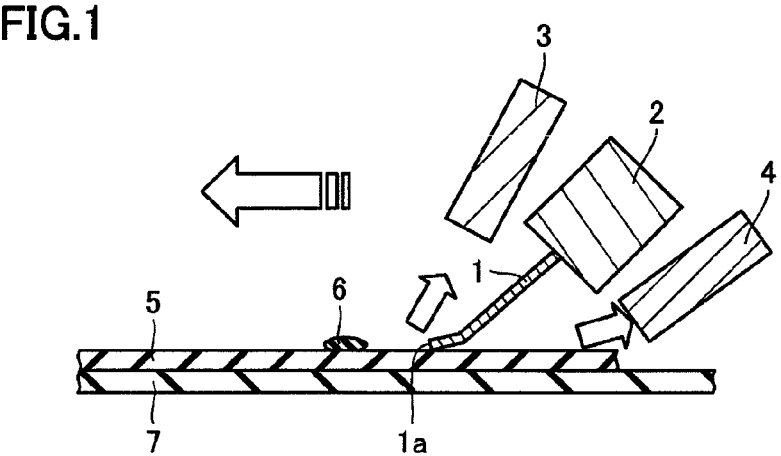
FIG. 1 is a cross-sectional view schematically showing a configuration of a substrate cleaning apparatus in accordance with an embodiment of the present invention.
Figure 2:
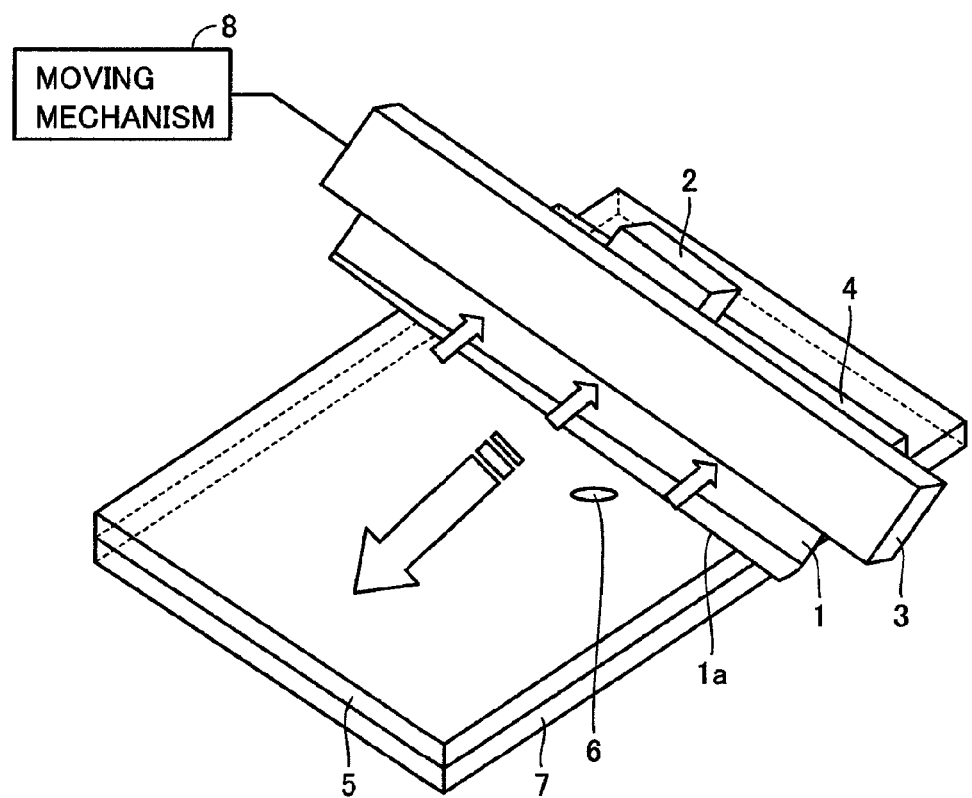
FIG. 2 schematically shows a configuration of the substrate cleaning apparatus in accordance with an embodiment of the invention.

FIG. 1 is a cross-sectional schematic view showing a configuration of a substrate cleaning apparatus in accordance with an embodiment of the present invention. FIG. 2 is a perspective view showing a configuration of the substrate cleaning apparatus in accordance with the present embodiment. A target to be cleaned by the substrate cleaning apparatus in accordance with an embodiment of the present invention is an upper surface of a first glass substrate 5 laminated on an upper surface of a second glass substrate 7. Foreign matters such as cullet 6 adhere to the upper surface of first glass substrate 5.

The substrate cleaning apparatus in accordance with the present embodiment includes a flat plate-like cleaning plate 1 as shown in FIGS. 1 and 2. Cleaning plate 1 is connected with a vibration unit 2 which vibrates cleaning plate 1 such that cleaning plate 1 is repeatedly pressed against the upper surface of first glass substrate 5. A first suction unit 3 having an intake opening in the vicinity of a tip end portion 1a of cleaning plate 1 is provided above cleaning plate 1. In addition, a second suction unit 4 having an intake opening in the vicinity of tip end portion 1a of cleaning plate 1 is provided below cleaning plate 1. The substrate cleaning apparatus is equipped with a moving mechanism 8 which integrally moves cleaning plate 1, first suction unit 3, and second suction unit 4 relative to the substrate.

In the following, an operation of the substrate cleaning apparatus in accordance with the present embodiment will be described. From above first glass substrate 5, cleaning plate 1 is brought closer to the upper surface of first glass substrate 5 so as to come into contact therewith at a predetermined angle. After tip end portion 1a of cleaning plate 1 comes into contact with the upper surface of first glass substrate 5, cleaning plate 1 is further brought closer to first glass substrate 5 to be pressed against the upper surface of first glass substrate 5 and brought into an elastically deformed state. Here, the contact of the cleaning plate may cause a scratch on the upper surface of first glass substrate 5.

Cleaning plate 1 is vibrated by the vibration unit connected thereto such that it is repeatedly pressed against the upper surface of first glass substrate 5. While being vibrated to move up and down, cleaning plate 1 is always kept in contact with first glass substrate 5 and elastically deformed. Thus, tip end portion 1a of cleaning plate 1 and the upper surface of first glass substrate 5 are kept in line contact or surface contact with each other. Therefore, even when a deviation from parallelism between cleaning plate 1 and first glass substrate 5 occurs, tip end portion 1a is not locally in contact but entirely in contact with the upper surface of first glass substrate 5. Vibration unit 2 may apply ultrasonic waves to cleaning plate 1. In this case, fine vibrations can be applied to cleaning plate 1.

First suction unit 3 and second suction unit 4 are connected to, for example, a not-shown fan to suck the upper surface of first glass substrate 5 from the intake openings arranged in the vicinity of tip end portion 1a of cleaning plate 1 without being in contact with first glass substrate 5. First suction unit 3 is arranged above cleaning plate 1 and thus mainly sucks the upper surface of cleaning plate 1 or the front surface of tip end portion 1a of cleaning plate 1. Second suction unit 4 is arranged below cleaning plate 1 and thus mainly sucks the upper surface of first glass substrate 5.

Cleaning plate 1, first suction unit 3, and second suction unit 4 are integrally moved relatively in the substrate cleaning direction by moving mechanism 8. For example, cleaning plate 1 may be moved relative to the substrate at a speed of 30 mm/sec to 200 mm/sec. In this manner, cleaning plate 1 is vibrating while moving relative to the upper surface of first glass substrate 5, so that foreign matters such as cullet 6 adhering to the upper surface of first glass substrate 5 can be separated from first glass substrate 5. Foreign matters such as cullet 6 separated from first glass substrate 5 are sucked and removed by first suction unit 3 and second suction unit 4.

The substrate cleaning apparatus in accordance with the present embodiment configured as described above achieves the following effects. Tip end portion 1a of cleaning plate 1 can be brought entirely into contact with the upper surface of first glass substrate 5, thereby preventing locally high contact stress. Since cleaning plate 1 is vibrating while moving relative to the upper surface of first glass substrate 5, an impacting shear force can be exerted on the foreign matters such as cullet 6 adhering to the upper surface of first glass substrate 5. Therefore, a high separating force can be achieved to separate the foreign matters from first glass substrate 5. When cleaning plate 1 is ultrasonically vibrated, the fine vibrations increase the efficiency of separating small foreign matters on first glass substrate 5. In addition, the separated foreign matters can be sucked and removed by suction units 3 and 4 before adhering again onto first glass substrate 5, thereby achieving a high cleaning performance.

Furthermore, since cleaning plate 1 is in contact with first glass substrate 5 in an elastically deformed state, cleaning plate 1 functions as a shock-absorbing material in the direction vertical to the upper surface of first glass substrate 5 when removing foreign matters from the upper surface of first glass substrate 5. Accordingly, the upper surface of first glass substrate 5 is less likely to be scratched. In addition, since suction units 3 and 4 suck the upper surface of first glass substrate 5 in a non-contact state, thereby preventing suction units 3 and 4 from scratching first glass substrate 5.

Figure 3:
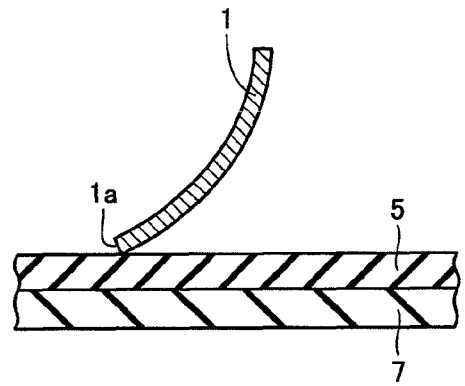
FIG. 3 is a cross-sectional view schematically showing a state in which a cleaning plate of the substrate cleaning apparatus is curved in accordance with an embodiment of the invention.
Figure 4:
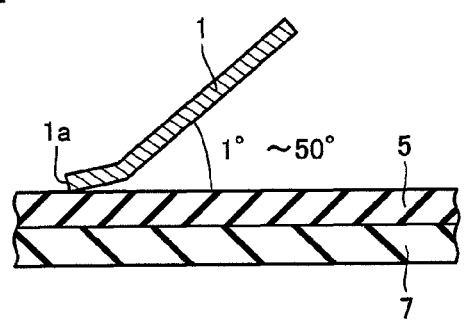
FIG. 4 is a cross-sectional view schematically showing a state in which the cleaning plate of the substrate cleaning apparatus is bent in accordance with an embodiment of the invention.
Figure 5:
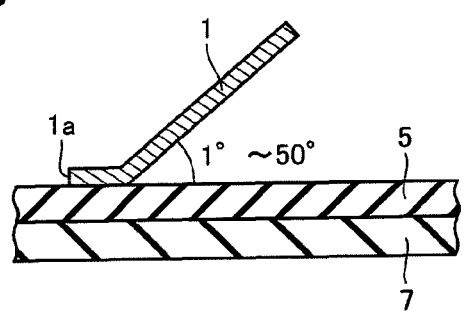
FIG. 5 is a cross-sectional view schematically showing a state in which the cleaning plate of the substrate cleaning apparatus is bent in accordance with an embodiment of the invention.

Now, cleaning plate 1 of the substrate cleaning apparatus in accordance with the present embodiment will be described. FIG. 3 is a cross-sectional schematic view showing a state in which cleaning plate 1 of the substrate cleaning apparatus is curved in accordance with the present embodiment. FIGS. 4 and 5 are cross-sectional schematic views showing a state in which cleaning plate 1 of the substrate cleaning apparatus is bent in accordance with the present embodiment.

When cleaning plate 1 is formed of a uniform plate-like material, during cleaning, cleaning plate 1 is curved at a predetermined curvature in line contact with first glass substrate 5 at tip end portion 1a, as shown in FIG. 3. For example, when cleaning plate 1 is formed of a stainless alloy such as SUS303 or SUS304 having a thickness of 0.05 mm to 0.2 mm, cleaning can be carried out with cleaning plate 1 in a curved state as shown in FIG. 3.

When cleaning plate 1, formed of a material with a small deformation resistance such as a thin plate-like material, is in contact with the upper surface of first glass substrate 5, for example, at such a small angle as 1° to 5°, first glass substrate 5 and tip end portion 1a may come into surface contact with each other. It is noted that protrusions and depressions such as burrs are removed from tip end portion 1a of cleaning plate 1. In this case, cleaning plate 1 comes into contact with first glass substrate 5 in an elastically deformed state, and the contact surface between first glass substrate 5 and cleaning plate 1 is large, so that the contact stress exerted on the upper surface of first glass substrate 5 is reduced.

As the characteristics required for the material forming such cleaning plate 1, a prescribed hardness or higher is required since tip end portion 1a should have a tensile strength so as to be able to repeatedly remove foreign matters such as hard cullet 6. Deformation resistance equal to lower than a prescribed resistance value is also required since cleaning plate 1 should be curved without scratching the upper surface of first glass substrate 5. In addition, fatigue resistance to vibrations and corrosion resistance to wet cleaning are also required. A metal thin plate or a resin composite material having those characteristics can be used as a material of cleaning plate 1. Stainless steel such as SUS303 or SUS304 as described above may be used.

With the configuration of cleaning plate 1 as described above, during cleaning, cleaning plate 1 is curved so that tip end portion 1a comes into line contact or surface contact with the upper surface of first glass substrate 5. The upper surface of first glass substrate 5 is cleaned with cleaning plate 1 in such a curved state, resulting in the effects as described below.

Tip end portion 1a of cleaning plate 1 can be brought entirely into contact with the upper surface of first glass substrate 5, thereby preventing locally high contact stress. Furthermore, since cleaning plate 1 is in contact with first glass substrate 5 in an elastically deformed state, cleaning plate 1 functions as a shock-absorbing material in the direction vertical to the upper surface of first glass substrate 5. Accordingly, the upper surface of first glass substrate 5 is less likely to be scratched.

As another configuration of cleaning plate 1, as shown in FIGS. 4 and 5, cleaning plate 1 may be bent to come into line contact or surface contact with the upper surface of first glass substrate 5. In this case, the inclination angle between cleaning plate 1 and first glass substrate 5, that is, the angle formed by cleaning plate 1 with respect to the upper surface of first glass substrate 5 when cleaning plate 1 is brought closer to first glass substrate 5, may be set, for example, to 1° to 50°. If this inclination angle is reduced, the shear force acting on cullet 6 on the upper surface of first glass substrate 5 can be increased. If the inclination angle is too small, however, cleaning plate 1 is not easily elastically deformed. Therefore, the inclination angle has to be adjusted as appropriate depending on conditions such as the kind of substrate to be cleaned, the cleaning speed, and the material of cleaning plate 1.

Figure 6A:
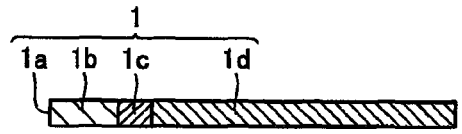
FIG. 6A is a cross-sectional view schematically showing an exemplary structure of the cleaning plate, which has not yet been bent.
Figure 6B:
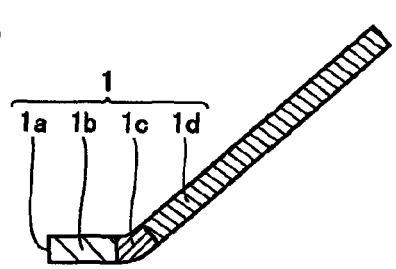
FIG. 6B is a cross-sectional view schematically showing the cleaning plate in surface contact with a glass substrate.
Figure 6C:
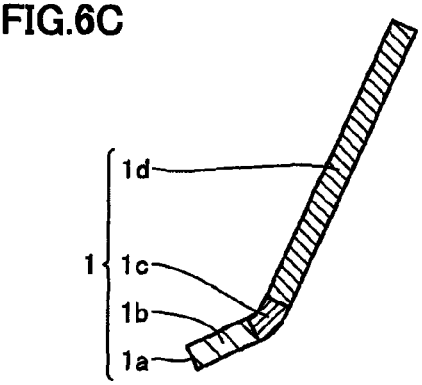
FIG. 6C is a cross-sectional view schematically showing the cleaning plate in line contact with a glass substrate.

FIG. 6A is a cross-sectional view schematically showing an exemplary structure of the cleaning plate, which has not yet been bent. FIG. 6B is a cross-sectional view schematically showing the cleaning plate in surface contact with a glass substrate. FIG. 6C is a cross-sectional view schematically showing the cleaning plate in line contact with a glass substrate.

As shown in FIG. 6A, the bendable and deformable cleaning plate 1 includes a first region 1b including tip end portion 1a, a third region 1d located opposite to tip end portion 1a, and a second region 1c formed between first region 1b and the third region. First region 1b and third region 1d are formed of a rigid material that is hardly deformed. Second region 1c is formed of a material that is easily deformed.

For example, second region 1c may be formed of an elastic body such as rubber, and first region 1b and third region 1d may be formed of a rigid body such as stainless steel. First region 1b and second region 1c as well as second region 1c and third region 1d may be connected with each other, for example, by applying an adhesive or by baking. In such a configuration, the elasticity modulus of second region 1c is higher than that of first region 1b and third region 1d, so that cleaning plate 1 pressed against first glass substrate 5 is bent at second region 1c. Furthermore, since second region 1c is formed of an elastic body, the bending of cleaning plate 1 is elastic deformation.

Alternatively, second region 1c may be formed of a hinge including a spring, and first region 1b and third region 1d may be formed of a rigid body such as stainless steel. Also in this case, cleaning plate 1 pressed against first glass substrate 5 is bent at second region 1c. Since second region 1c is formed of a hinge including a spring, the bending of cleaning plate 1 is elastic deformation in response to repulsive force of the spring.

Alternatively, first region 1b, second region 1c, and third region 1d may be formed of the same material, and only second region 1c may be formed of a material thinner than that of first region 1b and third region 1d. For example, first region 1b and third region 1d are formed at a thickness of 0.2 mm, and second region 1c is formed at a thickness of 0.05 mm. Also in such a configuration, the deformation resistance of second region 1c is lower than that of first region 1b and third region 1d, so that cleaning plate 1 pressed against first glass substrate 5 is bent at second region 1c.

As shown in FIG. 6B and FIG. 6C, because of the above-noted configuration of cleaning plate 1, cleaning plate 1 is bent at a specific part, so that tip end portion 1a comes into line contact or surface contact with the upper surface of first glass substrate 5. The upper surface of first glass substrate 5 is cleaned with cleaning plate 1 in such a bent state, resulting in the effects as described below. It is noted that protrusions and depressions such as burrs are removed from tip end portion 1a of cleaning plate 1.

Tip end portion 1a of cleaning plate 1 can be brought entirely into contact with the upper surface of first glass substrate 5, thereby preventing locally high contact stress on first glass substrate 5. Since cleaning plate 1 is in contact with first glass substrate 5 in an elastically deformed state, cleaning plate 1 functions as a shock-absorbing material in the direction vertical to the upper surface of first glass substrate 5. Accordingly, the upper surface of first glass substrate 5 is less likely to be scratched.

Figure 7:
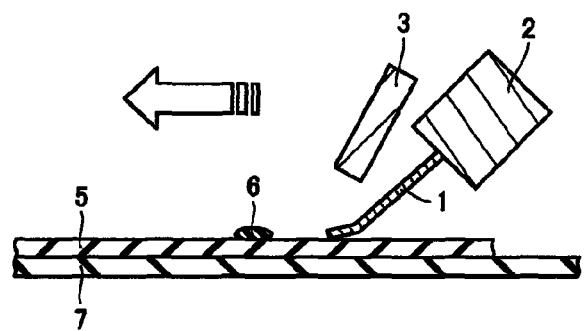
FIG. 7 is a cross-sectional view schematically showing the substrate cleaning apparatus with a suction unit only arranged above the cleaning plate.
Figure 8:
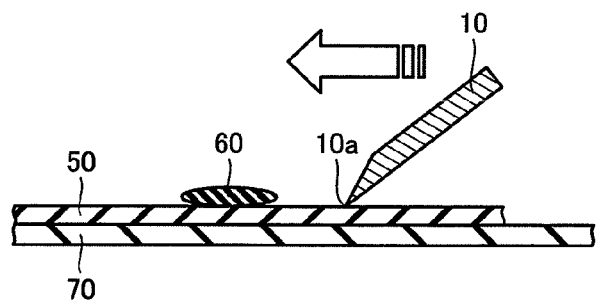
FIG. 8 is a cross-sectional view schematically illustrating an operation of a conventional substrate cleaning apparatus.
Figure 9:
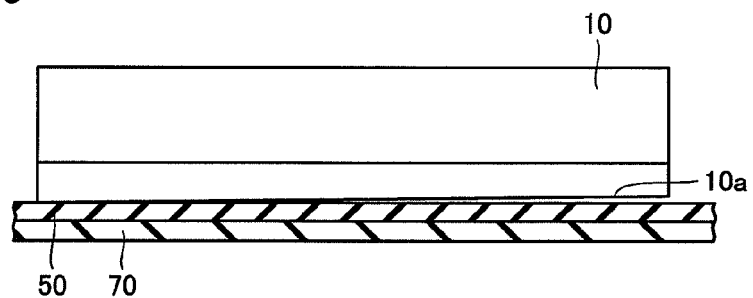
FIG. 9 is a side view schematically showing a contact state between a blade of the substrate cleaning apparatus shown in FIG. 8 and a glass substrate.
Figure 10:
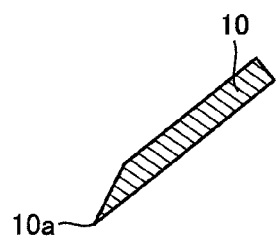
FIG. 10 is a cross-sectional view schematically showing a cross section of a blade included in a substrate cleaning apparatus.

FIG. 7 is a cross-sectional view schematically showing the substrate cleaning apparatus with the suction unit only arranged above the cleaning plate. As shown in FIG. 7, the substrate cleaning apparatus may be provided only with first suction unit 3 as a suction unit. In such a case, cutlet removed from first glass substrate 5 onto the upper surface of cleaning plate 1 can be sucked by first suction unit 3. The provision of the suction unit at one place can reduce the apparatus cost.

It should be noted that the foregoing embodiment disclosed herein is only shown by way of illustration in all respects and does not constitute a basis of restrictive interpretation. Therefore, the technical scope of the present invention is not interpreted only by the foregoing embodiment but is defined based on the claims. All modifications that fall within the meaning and range of equivalence to the claims are embraced herein.

DESCRIPTION OF THE REFERENCE SIGNS 1 cleaning plate, 1a, 10a tip end portion, 1b first region, 1c second region, 1d third region, 2 vibration unit, 3 first suction unit, 4 second suction unit, 5, 50 first glass substrate, 6, 60 cullet, 7, 70 second glass substrate, 8 moving mechanism, 10 blade.

The invention claimed is:

1. A substrate cleaning apparatus comprising:
a cleaning plate;
a vibration unit for vibrating said cleaning plate;
a suction unit having an intake opening in the vicinity of a tip end portion of said cleaning plate, for sucking an upper surface of a substrate to be cleaned without being in contact with the substrate; and
a moving mechanism for moving said cleaning plate relative to said substrate,
wherein the tip end portion of said cleaning plate is pressed against the upper surface of said substrate to cause said cleaning plate to be elastically deformed, and said cleaning plate moves relative to said substrate in a cleaning direction of said substrate, with the tip end portion of said cleaning plate being in line contact or surface contact with the upper surface of said substrate.

2. The substrate cleaning apparatus according to claim 1, wherein said cleaning plate is deformed in a curved manner.

3. The substrate cleaning apparatus according to claim 1, wherein said cleaning plate is deformed in a bent manner.

4. The substrate cleaning apparatus according to claim 1, wherein said vibration unit applies ultrasonic waves to said cleaning plate.

5. The substrate cleaning apparatus according to claim 1, wherein said cleaning plate includes stainless steel.

* * * * *